(12) United States Patent
Bennett et al.

(10) Patent No.: US 7,388,620 B2
(45) Date of Patent: Jun. 17, 2008

(54) METHOD AND SYSTEM FOR PAN-SCAN USING MOTION VECTORS PRESENTATION

(75) Inventors: William George Bennett, Vista, CA (US); Katsuhiko Nishikawa, Poway, CA (US); Frederick J. Zustak, Poway, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1063 days.

(21) Appl. No.: 10/692,456

(22) Filed: Oct. 23, 2003

(65) Prior Publication Data
US 2005/0099541 A1    May 12, 2005

(51) Int. Cl.
*H04N 5/46* (2006.01)
(52) U.S. Cl. ............................ 348/556; 348/445
(58) Field of Classification Search ................ 348/445, 348/555–556, 700, 561, 581, 580, 722
See application file for complete search history.

(56) References Cited

U.S. PATENT DOCUMENTS

| | | | |
|---|---|---|---|
| 4,943,856 A | 7/1990 | Bakhmutsky et al. ....... 358/141 |
| 6,016,362 A | 1/2000 | Kato et al. ................... 382/232 |
| 6,323,915 B1 | 11/2001 | Markflak et al. ........... 348/704 |
| 6,388,711 B1 | 5/2002 | Han et al. .................... 348/441 |
| 6,404,458 B1 | 6/2002 | Kang .......................... 348/445 |
| 6,408,096 B2 | 6/2002 | Tan ............................. 382/232 |
| 6,463,210 B1 | 10/2002 | Yokogawa ................... 386/125 |
| 6,470,051 B1 | 10/2002 | Campisano et al. ... 375/240.21 |
| 6,473,120 B2 | 10/2002 | Hirasawa et al. ........... 348/208 |
| 7,173,666 B1* | 2/2007 | Masaki et al. .............. 348/445 |
| 7,184,093 B2* | 2/2007 | Manning .................... 348/445 |

* cited by examiner

*Primary Examiner*—M. Lee
(74) *Attorney, Agent, or Firm*—John L. Rogitz

(57) ABSTRACT

Pan-scan is provided for a standard 4:3 aspect ratio TV displaying a 16:9 aspect ratio high definition (HD) video stream using the motion vectors that are part of MPEG-encoded streams. Specifically, if, for instance, the MPEG motion vectors indicate an object rapidly moving to the left, the left-most part of the HD video frames are shown, instead of remaining centered on the HD video frames and cutting off the left and right portions.

17 Claims, 2 Drawing Sheets exemplary logic

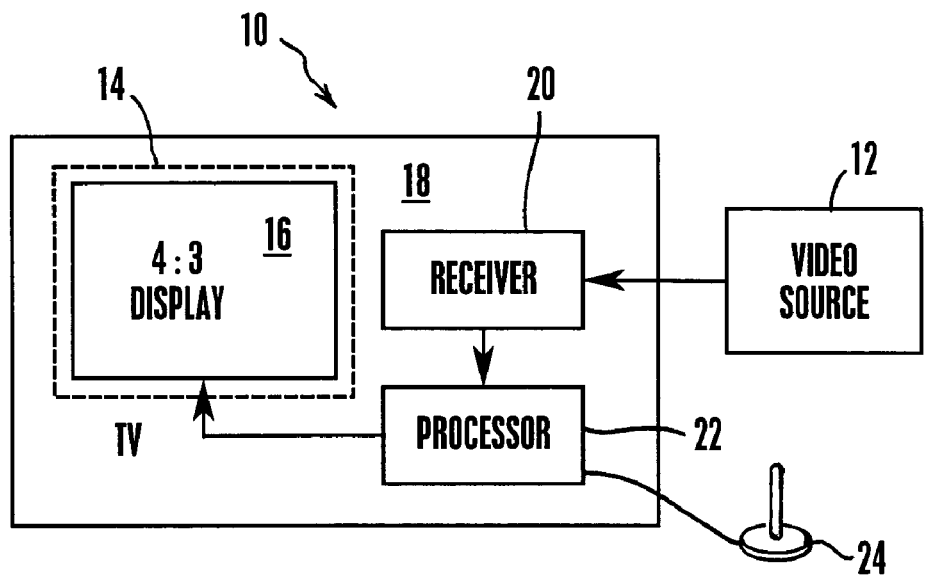
Fig. 1
Fig. 2  overall logic
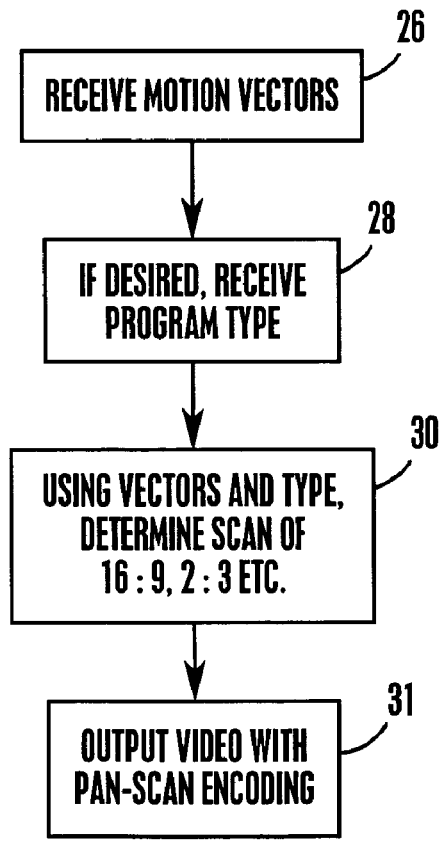

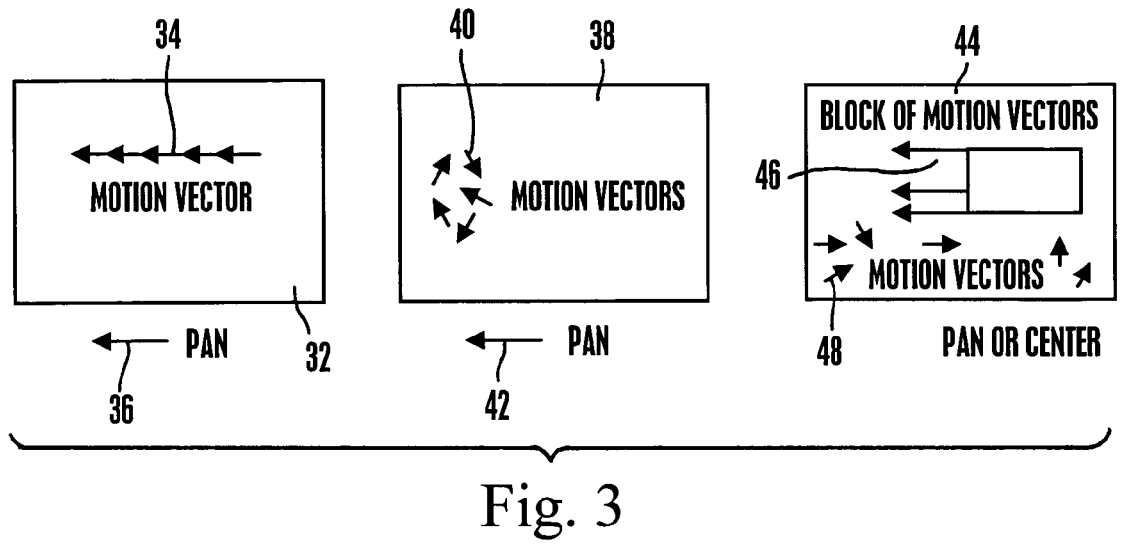
Fig. 3
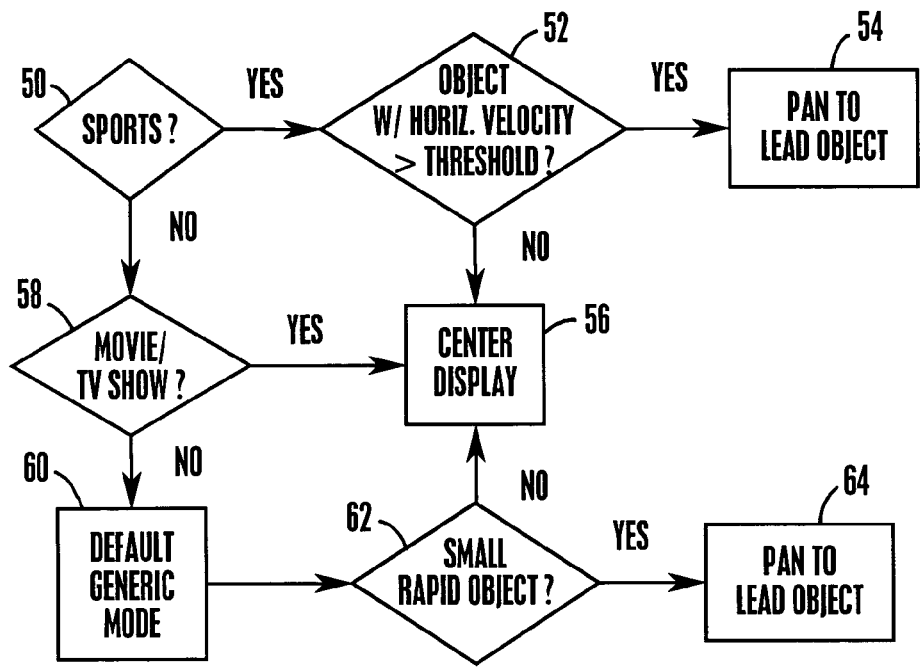
Fig. 4 exemplary logic

METHOD AND SYSTEM FOR PAN-SCAN USING MOTION VECTORS PRESENTATION

FIELD OF THE INVENTION

The present invention relates generally to televisions or video processing equipment that generates pan-scan vectors to be broadcast to displays with 4:3 aspect ratios.

BACKGROUND OF THE INVENTION

Digital multimedia data such as high definition (HD) video and music can be transmitted to televisions for display. The multimedia can be formatted in accordance with Moving Pictures Expert Group (MPEG) standards such as MPEG-1, MPEG-2 (also used for DVD format), MPEG-4 and other block based transform codecs. Essentially, for individual video frames called "intraframes" or "I-frames", these multimedia standards use Joint Photographic Experts Group (JPEG) compression. In JPEG, the image of a single frame is typically divided into small blocks of pixels (usually 8×8 and/or 1 6×16 pixel blocks) that are encoded using a discrete cosine transform (DCT) function to transform the spatial intensity values represented by the pixels to spatial frequency values, roughly arranged, in a block, from lowest frequency to highest. Then, the DCT values are quantized and compressed using run-length coding (essentially, storing a count of the number of, e.g., zero values that appear consecutively, instead of storing all the zero values).

Motion pictures add a temporal dimension to the spatial dimension of single pictures. MPEG is essentially a compression technique that uses motion estimation to further compress a video stream.

With more specificity, MPEG compression in general uses three kinds of video frames. Naturally, the above-mentioned I frames, in which the entire frame is a JPEG image composed of compressed, quantized DCT values, must be provided. But in MPEG compression the remaining frames (e.g., 59) that make up the rest of the video for that second are very much smaller frames that refer to the intraframes, in accordance with MPEG compression principles. In MPEG parlance these frames are called "predicted" frames ("P frames") and "bidirectional" frames ("B frames").

Of relevance to the present invention is that predicted frames contain motion vector references to the preceding intraframe or to a preceding predicted frame or B frame. If a block has changed slightly in intensity or color, then the difference between the two frames is also encoded in a predicted frame. Accordingly, MPEG computes motion vectors as part of rendering a stream, and these motion vectors, as recognized herein, are obtainable from the streams.

With respect to the above-mentioned HD video, a display having a 4:3 aspect ratio (width to height of display) such as a standard definition (SD) display that seeks to play HD video must essentially convert the 1,080 or 720 lines per image used in HD video to 480 lines per image used in SD displays or HD 4:3 displays. When the HD video has an aspect ratio of 16:9, a common feature of HD multimedia, the SD display must further trim the side portions of each image. Accordingly, so-called "pan and scan" has been introduced to selectively focus the picture received by a standard receiver on different portions (horizontal) of the HDTV picture, i.e., to pan and scan. Without a pan and scan feature, a 4:3 display will always display only the same fixed portion of HDTV picture (usually the center portion) to the exclusion of information at the edges of the HDTV picture.

In U.S. Pat. No. 4,943,856, incorporated herein by reference, a pan-scan feature is proposed in which data words are placed in the vertical blanking period of each frame of the HDTV signal. The data words are error-coded representations of the proportional relationship between the left and right panels of the HD video picture, and are used to scan the display either left or right over the picture.

As recognized by the present invention, not all HDTV programs are accompanied by the VBI pan-scan information. And, not all standard TVs are programmed to use the data words in the VBI, even if they are present. Nonetheless, the present invention recognizes a need for providing pan-scan of an HD image with a 16:9 aspect ratio in a 4:3 display, particularly under certain circumstances, so that interesting video information that otherwise would not be displayed is, in fact, presented to the user.

SUMMARY OF THE INVENTION

A system includes a display having a first aspect ratio, e.g., a 4:3 aspect ratio, and a source of video (e.g., HD MPEG video) that has a second aspect ratio (e.g., 16:9) that is different than the first aspect ratio such that the display cannot present an entire frame having the second aspect ratio. Means are provided for using motion vectors in the video to establish the portion of a video frame being presented. The means may be embodied in the video source (e.g., in the equipment that encodes the motion vectors) or in the display.

The preferred logic uses heuristics to determine whether, based on the motion vectors, an object in the video is moving at a speed above a threshold, and if so, panning the video in a direction of motion of the object. Exemplary non-limiting panning heuristics may include displaying a center portion of the video frame if the object in the video is not moving at a speed above the threshold. The video may be panned at a speed or amount that is proportional to the speed of the object as indicated by the motion vectors. If desired, the logic may pan the video based on a type of program embodied by the video.

In another aspect, a display has a 4:3 aspect ratio and a processor executes logic to present video on the display, with the video having an aspect ratio other than 4:3 such that only a portion of a frame of the video can be presented on the display. The logic comprises obtaining motion vectors from the video, and based on the motion vectors, determining the portion of the video frame to be presented on the display.

In yet another aspect, a source of video that sends video to televisions includes a processor executing logic to present video on the TV. The video has an aspect ratio other than 4:3 such that only a portion of a frame of the video can be presented on the display. The logic includes obtaining motion vectors from the video, and based on the motion vectors, determining the portion of the video frame to be presented on the display.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram showing the present system;

FIG. 2 is a flow chart of the overall logic;

FIG. 3 is a series of schematic diagrams of video frames with motion vectors; and FIG. 4 is a flow chart of a non-limiting exemplary implementation of the logic.

DETAILED DESCRIPTION OF THE PREFERRED EMBODIMENT

Referring initially to FIG. 1, a system is shown, generally designated 10, which includes a source 12 of multimedia data, e.g., a satellite, or a cable broadcast source, or an MPEG encoding apparatus that encodes, in the first place, a multimedia stream, or a wireless broadcast source, and so on. The multimedia data can be high definition (HD) video that is encoded using MPEG. In the preferred HDTV system shown, an HDTV picture frame 14 from the source 12 (schematically shown in dashed lines in FIG. 1) has a horizontal-to-vertical aspect ratio of 16:9, as opposed to the 4:3 aspect ratio of the display 16 of a standard TV 18 shown in FIG. 1. Thus, the picture frame 14 overlaps, particularly at the left and right edges, the display 16 such that only a portion of the frame 14 may be presented on the display 16. While FIG. 1 shows a display 16 of a TV 18, it is to be understood that the present invention generally applies to pan-scan of HD video on 4:3 displays.

The TV 18 shown in FIG. 1 includes a receiver 20 that receives multimedia streams from the source 12, including HD video streams, and a processor 22 that can include an MPEG decoder and that processes the multimedia for presentation thereof on the TV 18. The output of the processor 22 can be video with pan-scan encoding, and it can be displayed on the display 16. A user input device such as a joystick 24 for inputting control signals to the processor 22 may be provided for purposes to be shortly disclosed.

The processor 22 executes the logic below to pan the video such that a portion of the frame 14 is established for display based on object motion in the video. If desired, the logic may be implemented by the source 12, with panning signals in accordance with principles set forth further below being inserted into the video and received and executed by the TV processor 22. The logic may also be embodied in set-top boxes, computer devices, and other video production and/or display equipment. Thus, while FIG. 1 shows the processor 22 within the TV 18 proper, it may instead be disposed in a MPEG encoder or set-top box associated with the TV and, hence, in that sense be part of the TV.

FIG. 2 shows the overall logic. Commencing at block 26, motion vectors are received from, e.g., the video source 12 shown in FIG. 1. The behavior and statistics, among other things, of the motion vectors indicate the motion of objects in the video. In a preferred embodiment the motion vectors are obtained directly from the MPEG-encoded stream during decoding of the stream by the processor 22, i.e., from B- or P-frames in the stream as decoded by the processor 22. In other embodiments the motion vectors may be calculated by the processor 22 using MPEG motion vector calculation techniques, although this is not necessary when the received stream is MPEG-encoded and already has the motion vectors in the stream.

Moving to block 28, if desired the type of program may also be received as indicated in the stream itself or as determined by, e.g., noting that the video has a 2:3 pulldown or low data rate and inferring that the program consequently is a movie or TV show, as opposed to a sports program.

Proceeding to block 30, the logic of the present invention uses the motion vectors, including their behavior frame to frame and within a frame and statistics regarding motion vectors, such as how many there are, their magnitudes, whether they indicate motion in mostly one direction, etc. and, if desired, the program type, to establish which part of the MPEG-encoded 16:9 HD video frame 14 to present on the 4:3 display 16, i.e., to scan the HD video based on the motion vectors and user-defined heuristics. Video is then output at block 31 that includes the determined pan-scan encoding.

For instance, referring to FIG. 3, assume that frame 32 is one or more P-frames and that it contains a series of motion vectors 34 representing the motion of an object in the video. In the illustrative depiction shown in FIG. 3, the relatively long length of the vector 34 indicates that the associated video object is moving fast, and the arrow indicates that the object is moving left. In this case, the present logic uses a heuristic which essentially states, "pan left across the frame 32 when an object is moving left at a speed greater than the threshold" as indicated by the arrow 36. The portion of the frame 32 that is presented on the display 16 in FIG. 1 under these circumstances is that portion extending from the left-most edge of the frame 32 across the frame 32 to a distance that equals the horizontal display dimension of the display 16. Accordingly, the right-most portion of the frame 32 is clipped in this scenario, so that the object is "led".

In addition to the automatic panning feature discussed above, the user may also pan across the video frame using the joystick 24. The amount and/or speed of the panning, either user-originated or as determined by the logic above, may be proportional to the length of the motion vector, if desired. Indeed, under some conditions panning may be prohibited altogether or forced.

As another example of a heuristic that can be used by the present logic, assume that frame 38 in FIG. 3 is a P-frame and that it contains several motion vectors 40 representing respective objects moving in various directions near the left side of the frame. In this case, the present logic pans left across the frame 38 as indicated by the arrow 42 because most of the action in the video as indicated by the motion vectors 40 occurs in the left part of the picture.

As a contrasting example, assume that the frame 44 contains some motion vectors 46 that are parallel to each other and indicate leftward movement of their respective objects but that are moving relatively slowly in the center of the display. As also shown, other motion vectors 48 representing slowly moving, milling objects in the lower left portion of the frame are present. In this scenario, one heuristic that might be employed is, "center the display in the absence of determinate or strongly moving objects or uniform object motion near the edge of the display", in which case the logic would display the center portion of the frame 44. Another heuristic might be "pan slightly in the direction of movement of plural uniformly moving objects regardless of where the objects are in the frame", in which case the logic would pan slightly left. The skilled artisan will readily recognize that other heuristics based on the MPEG motion vectors can be used to pan the video.

FIG. 4 shows that the above-described panning heuristics can depend on program type, if desired, as such information that might be received in, e.g., the program itself. Commencing at decision diamond 50, it is determined whether the program is a sports show, and if so the logic moves to decision diamond 52 to determine, based on the MPEG motion vectors, whether an object is moving with a horizontal velocity at a speed in excess of a threshold (e.g., as might be indicated in the frame 34 of FIG. 3). If so, the logic moves to block 54 to pan to lead the object. If not, the logic may simply center the display at block 56.

Decision diamond 58 indicates that when the program is a movie or TV show (as might be indicated by, e.g., 2:3 pull-down in the program), wherein not as much action as a sports show is anticipated, the display can be centered on the video at block 56. Block 60 simply indicates that if the show cannot be placed into a genre, a default mode is entered, wherein if, by way of non-limiting example, it is determined at decision diamond 62 that a small object is rapidly moving or that there is off center activity, the video can be panned to lead the object at block 64.

While the particular METHOD AND SYSTEM FOR PAN-SCAN USING MOTION VECTORS PRESENTATION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

We claim:

1. A system, comprising:
   a display having a first aspect ratio;
   a source of video, the video using a second aspect ratio different than the first aspect ratio such that the display cannot present an entire frame of the video; and
   means for using motion vectors in the video to establish what portion of a video frame to present, wherein the means for using includes logic including:
   determining whether, based on the motion vectors, an object in the video is moving at a speed above a threshold, and if so, always panning the video in a direction of motion of the object.

2. The system of claim 1, wherein the means for using is in the source.

3. The system of claim 1, wherein the means for using is in the display.

4. The system of claim 1, wherein the first aspect ratio is 4:3, the second aspect ratio is 16:9, and the video is an MPEG-encoded video stream.

5. The system of claim 1, wherein if the object in the video is not moving at a speed above a threshold, the logic displays a center portion of the video frame.

6. The system of claim 1, wherein the logic pans the video at least in part in proportion to the speed of the object as indicated by the motion vectors.

7. The system of claim 1, wherein the logic pans the video at least in part based on a type of program embodied by the video.

8. A system, comprising:
   a display having a 4:3 aspect ratio;
   a procesor executing logic to present video on the display, the video having an aspect ratio other than 4:3 such that only a portion of a frame of the video can be presented on the display, the logic comprising:
   obtaining motion vectors from the video;
   based on at least one of: behavior, or statistics, of the motion vectors, determining the portion of the video frame to be presented on the display; and
   determining whether, based on at least one of: behavior, or statistics, of the motion vectors, an object in the video is moving at a speed above a threshold, and if so, panning the video in a direction of motion of the object.

9. The system of claim 8, wherein the aspect ratio of the video is 16:9, and the video is an MPEG-encoded video stream.

10. The system of claim 8, wherein if the object in the video is not moving at a speed above a threshold, the logic displays a center portion of the video frame.

11. The system of claim 8, wherein the logic pans the video at least in part in proportion to the speed of the object as indicated by the motion vectors.

12. The system of claim 8, wherein the logic pans the video at least in part based on a type of program embodied by the video.

13. A source of video, the source sending the video to at least one television, the source comprising:
   a processor executing logic to present video on the TV, the video having an aspect ratio other than 4:3 such that only a portion of a frame of the video can be presented on the display, the logic comprising:
   obtaining motion vectors from the video; and
   based on at least one of: behavior, and statistics, of the motion vectors, determining the portion of the video frame to be presented on the display, wherein the logic pans the video at least in part based on a type of program embodied by the video.

14. The source of claim 13, wherein the aspect ratio of the video is 16:9, and the video is an MPEG-encoded video stream.

15. The source of claim 13, wherein the logic includes determining whether, based on the motion vectors, an object in the video is moving at a speed above a threshold, and if so, panning the video in a direction of motion of the object.

16. The source of claim 15, wherein if the object in the video is not moving at a speed above a threshold, the logic displays a center portion of the video frame.

17. The source of claim 15, wherein the logic pans the video at least in part in proportion to the speed of the object as indicated by the motion vectors.

* * * * *